INVENTOR
JOHN F. SMITH

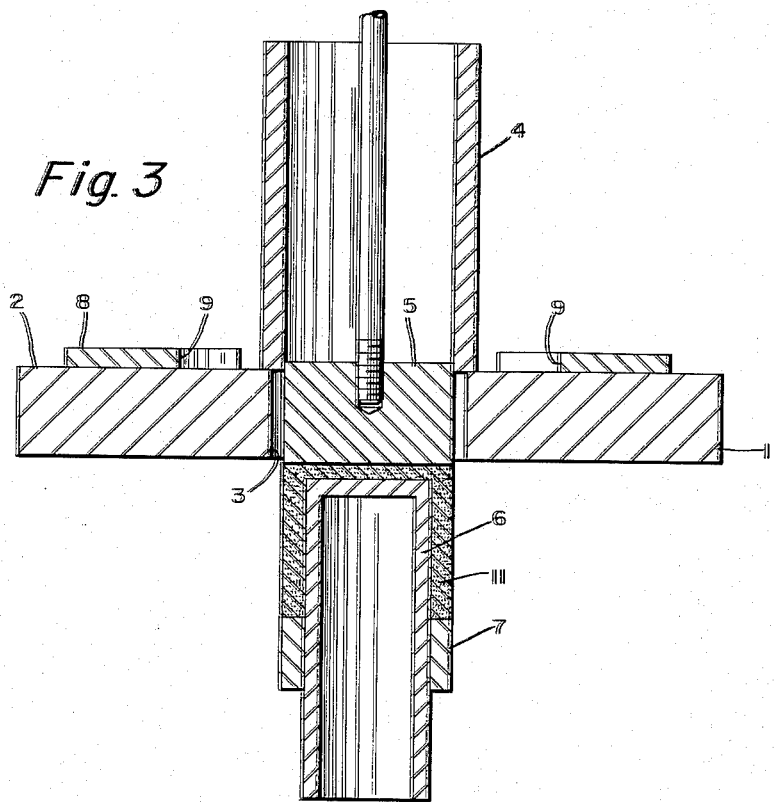
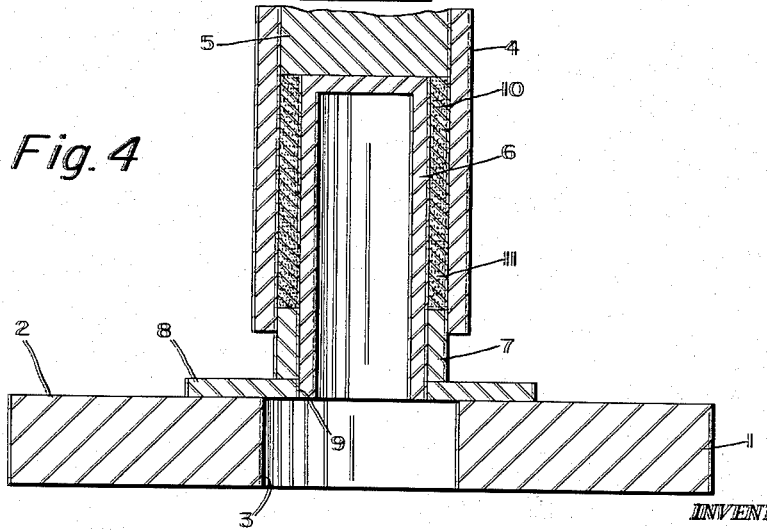

# United States Patent Office 2,996,759
Patented Aug. 22, 1961

2,996,759
METHOD OF AND APPARATUS FOR MANUFACTURING COMPRESSED ARTICLES
John F. Smith, 4251 E. 93rd St., Cleveland, Ohio
Filed May 19, 1959, Ser. No. 814,243
4 Claims. (Cl. 18—16.5)

This invention relates as indicated, to a method of and apparatus for manufacturing compressed articles, but has reference more particularly to a method and apparatus of this character which have been designed especially for the manufacture from powdered or granular materials, such as refractory metal oxides, cermets and metal powders, articles of various shapes, such as crucibles, saggers, tubes, etc.

A primary object of the invention is to provide a method and apparatus of the character described, through the use of which articles of uniform density and quality throughout are formed.

Another object of the invention is to provide a method and apparatus of the character described, in which a single-acting press is employed, utilizing dies or mold parts of simple construction, in contrast with the double action presses and intricate dies heretofore used for manufacturing such articles.

A still further object of the invention is to provide a method and apparatus which lends itself to the high-speed production of such articles.

Other objects and advantages of my invention will be apparent during the course of the following description.

In the accompanying drawings forming a part of this specification, and in which like numerals are employed to designate like parts throughout the same, FIG. 1 is a view, illustrating somewhat diagrammatically the first step in the method of molding or forming an article, in accordance with the method;

FIG. 3 is a view similar to FIG. 2, but showing the third or final step, embodying the ejection of the molded article from the mold, and FIG. 4 is a view similar to FIG. 1, but showing the method as applied to the manufacture of an open-ended or tubular article.

Figure 1:
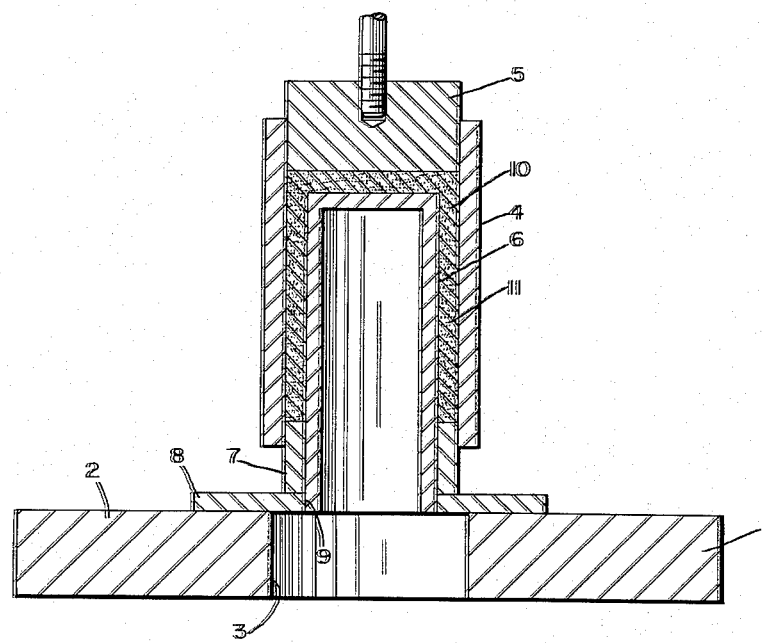
Figure 2:
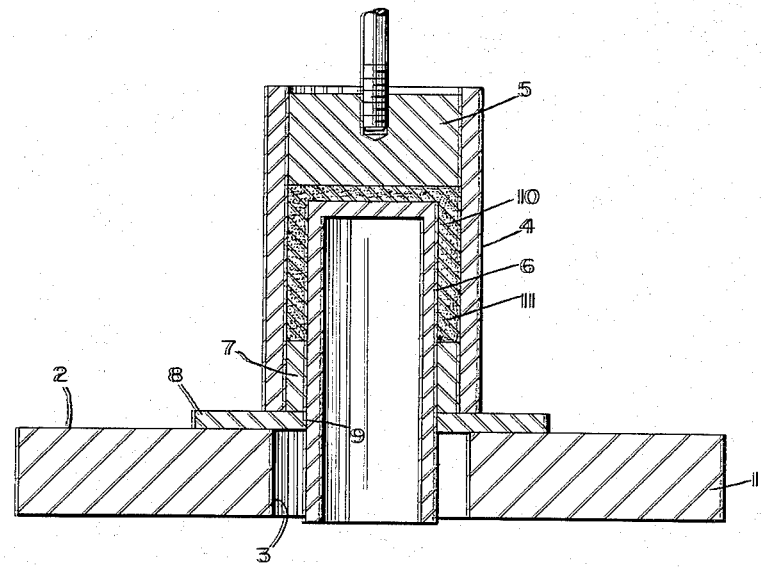
FIG. 2 is a view similar to FIG. 1, but showing the position of the parts at the conclusion of the molding operation.

In FIGS. 1, 2 and 3, I have illustrated, in successive steps, the method and apparatus of the invention, as applied to the manufacturing of crucibles of refractory oxides, such, for example, as zirconia.

The apparatus, as therein illustrated, comprises the base plate or table 1 of a hydraulic press, having a flat upper surface 2, and having an opening 3 extending vertically therethrough, this opening being of a diameter sufficient to permit the passage therethrough of the manufactured article, in this case, a crucible.

The apparatus further includes a tubular outer shell or casing 4, whose internal diameter must be less than that of the opening 3, a press ram 5 which is slidably movable in the shell or casing 4, a hollow or floating core 6, closed at the top and whose external diameter is less than the internal diameter of the casing 4, a spacer ring 7 which is interposed between the casing 4 and core 6 and is slidable relatively to the casing and core, and a spacer ring support 8, which rests on the surface 2 of the base plate 1, the support 8 having a central opening 9 which slidably receives the core 6.

In the case of articles of relatively small diameter, the support 8 may be a one-piece ring, but in the case of articles of relatively large diameter, the support 8 is preferably made of a split ring, i.e., a ring consisting of two or more segments, so that these segments may be moved radially outwardly, by any suitable mechanical means (not shown), to withdraw the support thereof from the spacer ring 7.

With the parts of the apparatus positioned, as shown in FIG. 1, the ram 5 of the press is lifted, and the space 10 between the casing 4 and core 6, is filled with a dry mixture 11 of zirconia powder. The term "dry mixture," as here employed, is intended to include a mixture having a moisture content of 6 or 7%, or some other binder, which facilitates handling and cohesion of the powder or grains of the mixture. The mixture is self-flowing, and the grains or particles thereof may be coarse or fine.

The space above the top of the core 6 is also filled with the aforesaid mixture, to a depth sufficient to form the bottom of the crucible.

With the apparatus or mold thus filled, the ram 5 is brought down to commence the compressing of the aforesaid mixture. As the compressing action progresses, the mixture is compressed to cause the grains of the mixture to cohere into a virtually solid mass to form the crucible, as best shown in FIG. 2.

During the formation or molding of the crucible, the casing 4 and core 6 do not remain stationary but move in unison with the material which is being compressed, moving to the position shown in FIG. 2. In other words, as the material is being compressed, lateral pressure is imparted by the material to the inner wall of the casing 4 and the outer wall of the core 6, as well as vertical pressure on the core, causing these parts to move to the position shown in FIG. 2. In this way, pressure is applied uniformly throughout the mold, resulting in the production of articles of uniform density, and quality throughout.

At the conclusion of the crucible molding operation, the casing 4 comes into abutment with the spacer ring support 8, and the lower portion of the core 2 has moved downwardly through the opening 3 in the base plate 1.

At this point, the support 8 is withdrawn from a position in which it supports the spacer ring 7. Where the support 8 is a one-piece ring, the ram 5, casing 4, core 6, and spacer ring 7, which are held together as a unit, by virtue of the pressure of the molded material on these parts, are lifted to a position in which the support 8 may be removed. Where, as in this case, the support 8 is a split ring, the pressure of the ram 5, is relieved momentarily, to permit the segments of the ring to be retracted or withdrawn laterally or radially to the position shown in FIG. 3, in which position, the molded crucible is ready to be ejected from the mold.

As shown in FIG. 3, continued downward movement of the ram causes the casing 4 to come into contact with the surface 2 of the base plate 1, stopping further movement of the casing, but the core 6, spacer ring 7, and the molded crucible, are moved through the opening 3 to the position shown, or to a lower position, in which the molded crucible may be lifted off the core 6.

In FIG. 4, I have illustrated the use of the apparatus to mold or form a tubular part or sleeve. In this case, the space 10 is filled with the mixture 11, but no material is placed on the top of the core 6. Then, by a procedure similar to that already described, the tubular part or sleeve is molded.

It is to be understood that following the foregoing procedure, the molded crucible or sleeve is fired or baked in a conventional manner which forms no part of the present invention.

As previously mentioned, the method and apparatus, as shown, or modified to meet the requirements of the specific article which is being molded, may be used to produce a large variety of articles of different shapes, sizes or dimensions, including hollow ware (crucibles, saggers,"

tubes), as well as solid pieces, and multiple cavity pieces in various shapes (round, square, multi-sided).

As stated also, the method and apparatus may be used for the manufacture of articles from cermets, metal powders, plastic powders, etc.

It may be noted that the parts 4, 6 and 7 are tubular parts, and may therefore be made inexpensively and in large quantities, from conventional tubing or the like. In some cases, as in the manufacture of tubular articles or sleeves, as shown in FIG. 4, the closure for the top of the core 6 may be omitted, and the ram brought directly down upon the upper end of a tubular core. Moreover, the core 6 may be a solid core, instead of a hollow core, as shown.

It is thus seen that I have provided a method and apparatus which is well adapted for the purposes for which they have been designed, through the use of which articles of uniform density and quality throughout are formed, which utilizes dies or mold parts of simple, inexpensive construction, and which lends itself to the high speed production of such articles.

The invention is also adapted for use in hot pressing, with reference to powdered metals, plastics, or other heat-setting materials, in which the article being manufactured can be sintered or cured in the mold, with the addition of heat.

It will be understood that various changes may be made in the method and apparatus, as illustrated, without departing from the spirit of the invention or the scope of the appended claims.

Having thus described my invention, I claim:

1. In a method of the character described, the steps which comprise providing concentrically-spaced mold parts and a spacer closing the lower end of the space between such parts, supporting said spacer on a base having an opening therein, filling said space with a granular or powdered material, compressing said material by means of a ram to mold the material, said parts moving in unison with the ram as the material is compressed, withdrawing the support of said spacer at the conclusion of the molding operation, and then ejecting the molded article and the spacer through said opening.

2. An apparatus of the character described, comprising a mold supporting element, a base plate for supporting said element, a spacer ring supported on said element, a core and outer casing maintained in spaced relation by said spacer ring, said base plate having an opening therein for passage of said ring and core, and a ram slidably movable in said outer casing, and means for withdrawing said supporting element from its support of said ring.

3. In a method of molding parts from granular or powdered material, in which a core and outer casing are provided to form a space therebetween adapted to receive said material, an element is provided for spacing said core and outer casing and for supporting said material, means are provided for maintaining said element against movement during the molding operation, and a ram is provided for compressing said material; the steps of filling said space with said material, compressing said material by movement of said ram while maintaining said element against movement during the molding operation, the compression of said material transmitting lateral pressure to said casing and core sufficient to cause said casing and core to be supported solely by said material and to move in the direction of movement of the ram as the ram moves, the compression of said material and the movement of said casing and core continuing until the conclusion of the molding operation, and then moving said ram, core and element sufficiently to eject the core, element and molded part from said casing.

4. In a method of molding parts from granular or powdered material the steps comprising, providing concentrically spaced core and outer casing mold parts, closing a portion of the space between said parts by a spacer, depositing mold material in the space between said mold parts, compressing said material by moving a ram thereagainst while supporting the spacer against ram movement, and concurrently moving said core and outer casing mold parts in the direction of the ram due to lateral-pressure-created friction between the material and said mold parts, continuing the compression of said material and the movement of said core and outer casing mold parts until the conclusion of the molding operation, then freeing the spacer from its support and continuing ram movement for ejecting the core, spacer and molded article while restraining the outer casing part against movement, and then removing the molded article.

References Cited in the file of this patent

UNITED STATES PATENTS

| | | |
|---|---|---|
| 965,004 | Pauley | July 19, 1910 |
| 1,029,561 | Pauley | June 11, 1912 |
| 1,140,785 | Williams | May 25, 1915 |
| 1,156,521 | Carius | Oct. 12, 1915 |
| 1,679,408 | Davis et al. | Aug. 7, 1928 |
| 1,822,939 | Stout | Sept. 15, 1931 |
| 1,941,812 | Muntz | Jan. 2, 1934 |
| 2,398,227 | Hubbert | Apr. 9, 1946 |
| 2,509,783 | Richardson | May 30, 1950 |
| 2,543,439 | Coomes et al. | Feb. 27, 1951 |